(12) United States Patent
Terhoerst

(10) Patent No.: US 10,393,855 B2
(45) Date of Patent: Aug. 27, 2019

(54) METHOD OF DETERMINING THE POSITION OF AN RFID TRANSPONDER

(71) Applicant: GM GLOBAL TECHNOLOGY OPERATIONS LLC, Detroit, MI (US)

(72) Inventor: Dietmar Terhoerst, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 277 days.

(21) Appl. No.: 15/383,883

(22) Filed: Dec. 19, 2016

(65) Prior Publication Data

US 2017/0176571 A1    Jun. 22, 2017

(30) Foreign Application Priority Data

Dec. 19, 2015 (DE) .................... 10 2015 016 517

(51) Int. Cl.
| | |
|---|---|
| *G01S 5/02* | (2010.01) |
| *G01S 5/14* | (2006.01) |
| *G06K 7/10* | (2006.01) |
| *G01S 13/87* | (2006.01) |
| *G01S 5/12* | (2006.01) |

(52) U.S. Cl.
CPC .............. *G01S 5/0273* (2013.01); *G01S 5/14* (2013.01); *G01S 13/878* (2013.01); *G06K 7/10128* (2013.01); *G06K 7/10366* (2013.01)

(58) Field of Classification Search
CPC ........ G01S 5/0273; G01S 5/14; G01S 13/878; G06K 7/10128; G06K 7/10366
USPC ....................................................... 455/41.1
See application file for complete search history.

(56) References Cited

U.S. PATENT DOCUMENTS

| | | | |
|---|---|---|---|
| 6,946,949 B2 | 9/2005 | Heide et al. | |
| 7,873,326 B2 | 1/2011 | Sadr | |
| 7,903,022 B2 | 3/2011 | Ohara et al. | |

(Continued)

FOREIGN PATENT DOCUMENTS

| | | | |
|---|---|---|---|
| DE | 102009010857 A1 | 9/2010 | |
| DE | 102014001321 A1 | 8/2015 | |
| WO | WO-2005114593 A1 * | 12/2005 | ......... B60R 25/2072 |

OTHER PUBLICATIONS

German Patent Office, German Search Report for German Application No. 102015016517.8, dated Jun. 22, 2016.

(Continued)

*Primary Examiner* — Lee Nguyen
(74) *Attorney, Agent, or Firm* — Lorenz & Kopf LLP

(57) ABSTRACT

A method is disclosed for determining the position of an RFID transponder. Separate signals of at least two electromagnetic alternating fields are emitted from at least two antenna to one RFID transponder. The antenna are spaced at a distance from each other so that the two electromagnetic alternating fields are emitted at a distance from one another. The emitted electromagnetic alternating fields to the one RFID transponder are reflected so that the reflected electromagnetic alternating fields are sent back to the antenna. The transit times of the electromagnetic alternating fields are determined from emission to receiving back at the antenna. The distances between the antenna and the RFID transponder are determined, and the position of the RFID transponder from the at least two distances is determined relative to the at least two antenna.

16 Claims, 3 Drawing Sheets

(56) References Cited

U.S. PATENT DOCUMENTS

| | | |
|---|---|---|
| 8,326,451 B2 | 12/2012 | Schantz et al. |
| 9,373,012 B2 | 6/2016 | Pesavento et al. |
| 2007/0109099 A1* | 5/2007 | Raphaeli ............... G01S 13/758 340/10.2 |
| 2009/0212921 A1 | 8/2009 | Wild et al. |
| 2014/0015546 A1 | 1/2014 | Frederick |

OTHER PUBLICATIONS

Kun-Ming Yu, Ming-Gong Lee, Chien-Tung Liao, Hung-Jui Lin, Design and Implementation of a RFID Based Real-Time Location-Aware System in Clean Room, 2009 IEEE International Symposium on Parallel and Distributed Processing With Applications, Aug. 18, 2009; http://ieeexplore.ieee.org/document/5207910/?reload=true.

OMRON Develops a World-First Technology for Measuring the Distance Between RFID UHF-band Antenna and IC Tags, OMRON Global, Tokyo, Japan, Sep. 10, 2007; http://www.omron.com/media/press/2007/09/p0910.html.

Hao Min, Readers That Sense Distance, Feb. 15, 2010; http://www.rfidjournal.com/articles,view?7393.

Guangwei Liu, Luhong Mao, Liying Chen, Sheng Xie, Locatable-Body Temperature Monitoring Based on Semi-Active UHF RFID Tags, ISSN 1424-8220; Sensors 2014, 14; www.mdpi.com/journal/sensors.

\* cited by examiner

METHOD OF DETERMINING THE POSITION OF AN RFID TRANSPONDER

CROSS-REFERENCE TO RELATED APPLICATION

This application claims priority to German Patent Application No. 102015016517.8, filed Dec. 19, 2015, which is incorporated herein by reference in its entirety.

TECHNICAL FIELD

The present disclosure pertains to a method of determining the position of an RFID transponder and a motor vehicle.

BACKGROUND

Reading devices or readers and an RFID transponder form a transmitter-receiver system for the identification and localization of objects which are attached to the RFID transponder. An RFID system thus includes an RFID transponder and a reader. RFID systems are used in a wide variety of technical solutions. For example, they are used in retail outlets on cash tills for identifying products to be paid for, or in logistics and in warehouses for the correct recording of incoming and outgoing goods, as well as for inventories and the retrieval of objects. Additional, they can also be used for identifying persons or also for identifying motor vehicles.

In motor vehicles, RFID systems are also deployed for the wireless, radio-based unlocking of doors of the vehicle and for the wireless, radio-base starting of a drive motor of the vehicle. If the corresponding RFID transponder is located within the transmission range of the reading device or reader, automatic starting or start/drive clearance of the drive motor or automatic unlocking of the vehicle doors takes place. The unlocking or starting takes place if the key with the corresponding RFID transponder is located within the transmission range of the reading device or reader. However, by amplification or a transmission system (data transmission system) of the transmission signal emitted by the reader, the key with the corresponding RFID transponder can also be inadvertently or unintentionally activated by thieves. If, for example, the key with the RFID transponder is in a house and the motor vehicle is in parking area in front of the house, through this amplification/transmission, the motor vehicle can be unlocked and started even though the RFID transponder is in the possession of the owner of the vehicle. Through this theft of the vehicle is possible.

U.S. Pat. No. 7,903,022 B2 describes a device for determining a distance between a transmitter and a receiver is known. The distance is determined by a phase change between a first signal and a second signal.

SUMMARY

In accordance with the the present disclosure, a method is provided to determine the position of an RFID transponder and a motor vehicle in which the position can be reliably and precisely determined with little technical outlay. In an embodiment, the method of determining the position of an RFID transponder includes separate emission of at least two electromagnetic alternating fields from at least two antenna to one RFID transponder. The antenna are at a distance from each other so that the two electromagnetic alternating fields are emitted at a distance from one another. Reflection of the emitted electromagnetic alternating fields to the one RFID transponder so that the reflected electromagnetic alternating fields are sent back to the antenna. The transit times of the electromagnetic alternating fields are determined from emission to receiving back at antenna. A determination of the distances between the antenna and the RFID transponder are determined. The position of the RFID transponder is determined from the distances relative to the antenna.

The electromagnetic alternating field is is made up, for example, of radio waves or light, for instance infrared light. Sound is preferably also subsumed under the term electromagnetic alternating field. The propagation speed of the electromagnetic alternating field is known so that from the transit time of the electromagnetic alternating field from emission to being received back the distance of each antenna to the respective RFID transponder can be determined. On the basis of the determined distances, the position of the RFID transponder with regard to the two antenna can be determined. Preferably the separate emission of the electromagnetic alternating fields from the different antenna takes place at the same time and the electromagnetic alternating fields are differentiated, for example, by way of a different frequency of the at least two emitted electromagnetic alternating fields. Preferably the electromagnetic alternating fields are reflected simultaneously on the RFID transponder.

In an additional embodiment, with two antenna the position of the RFID transponder is determined two-dimensionally from the at least two distances relative to the at least two antenna. With two antenna, the position of the RFID transponder can be determined two-dimensionally. For this a corresponding notional plane relating to the two antenna is assumed so that resulting therefrom the two-dimensional position of the RFID transponder can be determined.

In an additional variant the position of the RFID transponder is determined three-dimensionally with at least three antenna from the at least two distances relative to the at least three antenna. With three antenna, the position of the RFID transponder can be determined three-dimensionally relative to the at least three antenna.

In an additional embodiment the at least two antenna are part of at least one reader. The at least two antenna for emitting and receiving the electromagnetic alternating field are part of a reader or reading device.

In a further embodiment, determination of the position of the RFID transponder from the at least two distances relative to the at least two antenna is carried out repeatedly at a time interval so that a movement and/or speed of movement and/or a direction of movement of the RFID transponder is determined from the determined positions.

In an additional embodiment, the emitted at least two electromagnetic alternating fields are reflected on one, more particularly only one identical, antenna of the RFID transponder. The RFID transponder includes an antenna and the electromagnetic alternating fields emitted by the antenna of the at least one reader are reflected on the antenna of the RFID transponder.

In an additional embodiment, in order to activate the reflection properties of the antenna of the RFID transponder, an electromagnetic alternating field is emitted from at last one antenna of the at least one reader, the reflection properties of the antenna of the RFID transponder are then activated so that at least two electromagnetic alternating fields are reflected on the antenna of the RFID transponder. Only after receiving the electromagnetic activation alternating field is the reflection property of the antenna of the RFID transponder activated by a microchip of the RFID transponder so that through this the electromagnetic alternating fields emitted by the at least two antenna of the at least one reader are reflected on the antenna of the RFID transponder. The electromagnetic activation field and the electromagnetic alternating field can also be emitted at the same time.

In an additional variant, in order to determine the at least two transit times of the at least two electromagnetic alternating fields from emission to being received back at the at least two antenna, the emitted electromagnetic alternating fields are modified and the at least two transit times are determined from the respective time differences from the start of emission of the respective modified electromagnetic alternating field to receiving back the modified electromagnetic alternating fields In an additional variant the emitted electromagnetic alternating fields are modified in that each $x^{th}$ wave has a different amplitude from the other waves outside the $x^{th}$ wave and/or the frequency of which is changed and/or a phase shift is carried out and/or switching off of the emitted at least one electromagnetic alternating field is carried out and/or switching on of the emitted electromagnetic alternating field is carried out, and/or a direct digital frequency synthesis is carried out.

Expediently, the received back changed electromagnetic alternating fields are differentiated by at least one reader from unmodified electromagnetic alternating fields.

In an additional variant, the emitted electromagnetic alternating fields and/or activation alternating fields are cryptographically secured. The electromagnetic alternating fields and/or the activation alternating fields are thus cryptographically secured so that unauthorised third parties cannot transmit equivalent electromagnetic alternating fields and/or activation alternating fields to the RFID transponder corresponding to the effect of the cryptographically-secured electromagnetic alternating fields and/or activation alternating fields on the RFID transponder.

In an additional variant the position of several RFID transponders is determined and the RFID transponders are differentiated with a transmitted identification code. To determine the position of several RFID transponders these can be differentiated with a corresponding identification code which is transmitted by the RFID transponder.

In a further embodiment different electromagnetic alternating fields are emitted by different antenna of the at least one reader and the transit time of each electromagnetic alternating field from emission to receiving back at an identical antenna of the at least one reader is determined, wherein the emission of the different electromagnetic alternating fields preferably takes place at the same time. The different electromagnetic alternating fields differ, for example, through a different frequency and/or a different amplitude and/or other amplitudes at each $x^{th}$ wave of the electromagnetic alternating fields as waves.

In an additional embodiment the received back, different, preferably modified electromagnetic alternating fields emitted by different antenna of the at least one reader, are differentiated by the at least one reader and in each case one different electromagnetic alternating field is only recorded by that reader from which it was emitted. As in each case the distance between a reader and the RFID transponder is to be determined, it is necessary that the received back different electromagnetic alternating fields can be assigned to the reader with the antenna from which these electromagnetic alternating fields were emitted. This is necessary so that in each case the distance between only one antenna of the reader and the RFID transponder can be determined.

The present disclosure also includes a computer program with program coding which are stored on a computer-readable data carrier in order to implement a method described in this patent application when the computer program is stored on a computer or a corresponding processing unit. Forming part of the present disclosure is also a computer program product with program coding means which are stored on a computer-readable data carrier in order to implement a method described in this patent application when the computer program is stored on a computer or a corresponding processing unit.

System according to the present disclosure with a motor vehicle and an RFID transponder, the motor vehicle including a vehicle body, at least one drive motor, more particularly an internal combustion engine and/or electric motor, an interior space for accommodating persons which is enclosed by the vehicle body, at least two antenna which are built into the motor vehicle, wherein a method described in this patent application is implementable preferably for determining the position of the RFID transponder from the at least two distances relative to the motor vehicle.

In an additional embodiment the motor vehicle includes at least two reading devices and one antenna is built into each reading device.

In an additional embodiment the RFID transponder is an RFID transponder for unlocking at least one door of the motor vehicle and the at least one door is only unlockable if the RFID transponder is located relative to the motor vehicle on the basis of the determined position of the RFID transponder within an area of a notional plane in the case of two-dimensional determination or a space in the case of three-dimensional determination and/or the RFID transponder is an RFID transponder for starting or clearing the starting of the at least one drive motor and the at least one drive motor can only be started if the RFID transponder is located relative to the vehicle on the basis of the determined position of the RFID transponder within an area of a notional plane in the case of two-dimensional determination or a space, in particular the interior space of the motor vehicle delimited by the vehicle body in the case of three-dimensional determination.

In a further embodiment the RFID transponder is attached to a motor vehicle and to determine the position of the motor vehicle, the method described in the patent application is implemented, for example in a multi-level car park or on an access road with a barrier or access-restriction device.

In a further embodiment the at least one RFID transponder is attached in each case to a component or a part of a motor vehicle and for determining the position of the at least one component or at least one part during the manufacturing of the motor vehicle the method described in this patent application is implemented. The manufacturing and assembly of the motor vehicle can thus be significantly improved.

In a further variant the at least one RFID transponder is attached in each case to a component or a part in a logistics centre and/or store and for determining the position of the at least one component or the at least one part in the logistics centre or the store the method described in this patent application is implemented.

In a further embodiment the at least one RFID transponder is attached in each case to an object or a part and for determining the position of the at least one object or at the least one part method described in this patent application is implemented.

In a further embodiment the system includes a central processing unit and/or the at least one reader includes a processing unit or a microcontroller for controlling and/or regulating and/or or implementing the method and preferably the processing unit includes a computer program or software and/or a computer program product and/or a data memory with software for implementing a method described in this patent application.

Expediently, the reading device or the reader includes an antenna, a device for generating an electromagnetic alternating field with the antenna, a device for recording an electromagnetic alternating field received with antenna, preferably a processing unit, preferably an energy supply, for example a power line or battery.

In a further embodiment the RFID transponder includes a microchip, an antenna, for example in the form of a coil, strip conductor in the case of a dipole antenna or slot antenna, preferably a carrier or a housing, preferably a power source, for example a battery. The RFID transponder is a passive RFID transponder or an active RFID transponder with an energy source, more particularly a battery.

Preferably the distance between the two antenna of the at least one reader is greater than 5 cm, 10 cm, 30 cm, 50 cm or 100 cm and/or less than 25 m, 10 m or 2 m.

In a further embodiment a reader includes one antenna or more antenna.

In a further embodiment the RFID transponder is built into an accessory component, for example a reading lamp, a searchlight, a floor light, and the accessory component can be switched on or off in the event that the RFID transponder is located, relative to the motor vehicle on the basis of the determined position of the transponder, within an area of a notional plane in the case of two-dimensional determination or a space, more particularly a part of the internal space of the motor vehicle delimited by the vehicle body, in the case of three-dimensional determination.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
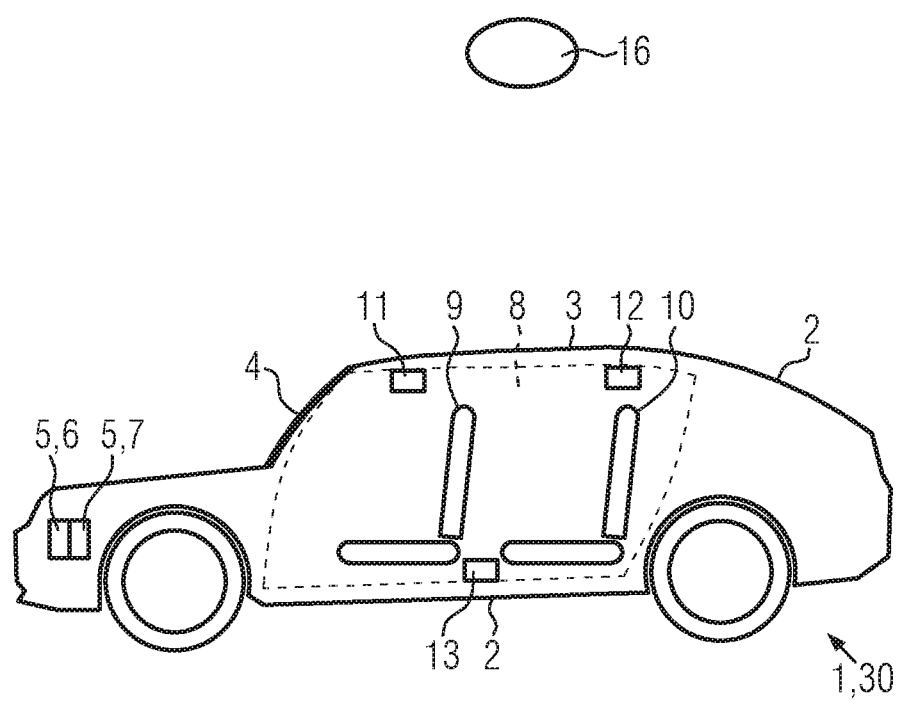
FIG. 1 shows a side view of a motor vehicle.
Figure 2:
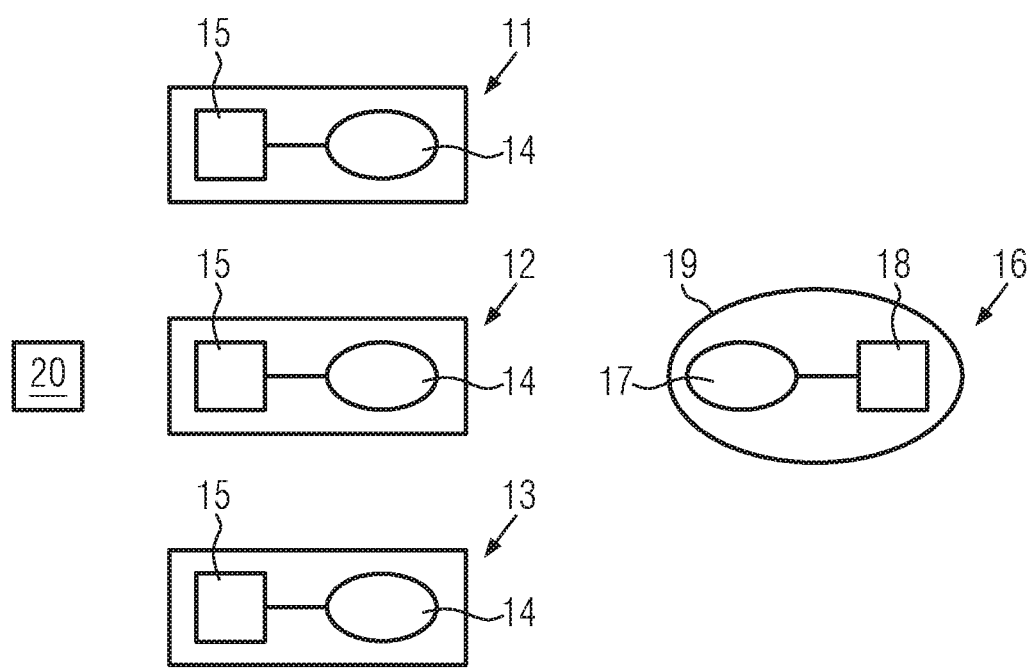
FIG. 2 shows a greatly simplified view of three reading devices, an RFID transponder.
Figure 3:
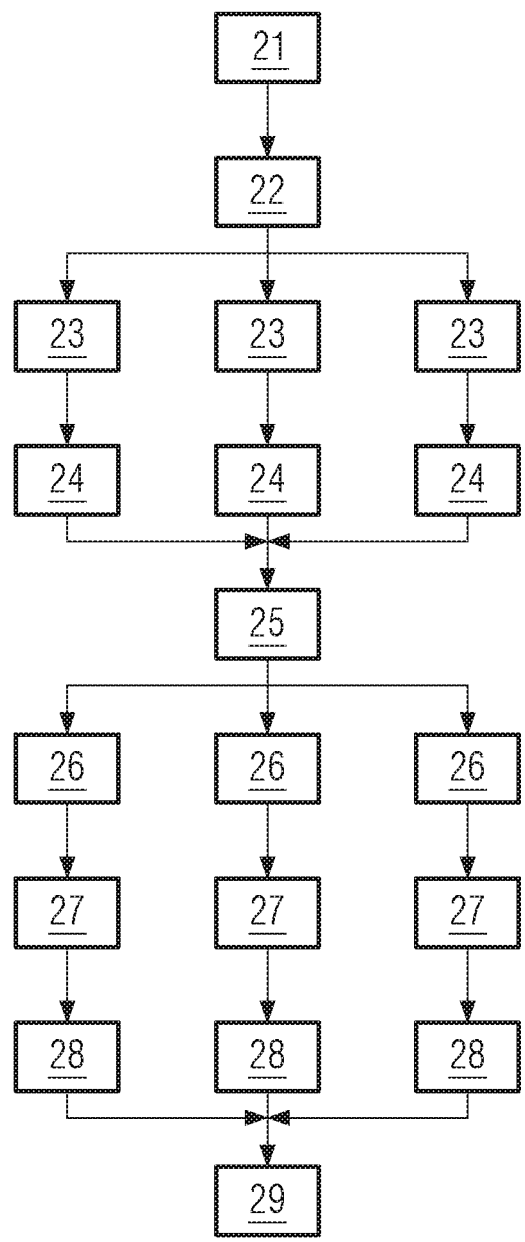
FIG. 3 shows as flow chart of the method of determining the position of the RFID transponder.

A motor vehicle 1 (FIG. 1) has an interior space 8 and arranged within the interior space 8 are two front seats 9 and several rear seats 10 for accommodating passengers of the motor vehicle 1. The motor vehicle 1 is driven by a drive motor 5, namely an internal combustion engine 6 and/or an electric motor 7. The interior space 8 is defined or enclosed by a vehicle body 2 of the motor vehicle 1 made, for example, of metal, in particular steel and/or aluminium, and/or of plastic, and an upper end area of the interior space 8 is delimited by a roof lining 3. The view to the outside from the interior space 8 to the outside is provided by a windscreen 4.

Three readers or reading devices 11, 12, 13 are built into the motor vehicle 1, namely a first reader 11, a second reader 12 and a third reader 13. Each of the readers 11, 12, 13 includes an antenna 14 and a device 15 for generating an electromagnetic alternating field with the antenna 14 and a device 15 for recording an electromagnetic alternating field received with antenna 14. An RFID transponder 16 includes an antenna 17, a microchip 18 and a carrier 19 or a housing 19. The RFID transponder 16 is built into a radio-based, non-mechanical key for unlocking and starting the motor vehicle 1. The three readers 11, 12, 13 are attached to or integrated into the motor vehicle 1 at a distance from one another. The three readers 11, 12, 13 are connected to a central processing unit 20 with corresponding data and power lines (not shown). Energy is supplied to the three readers 11, 12, 13 by power lines, which are not shown, from the on-board network of the motor vehicle 1. The processing unit 20 can also be arranged in a reader 11, 12, 13 (not shown).

The motor vehicle 1, the three readers 11, 12, 13 and the RFID transponder 16 thus form a system 30 and with the system 30, the position of the RFID transponder 16 relative to the motor vehicle 1 can be determined. From one reader 11, 12, 13, i.e. an antenna 14 of the reader 11, 12, 13, emission 21 of the electromagnetic activation alternating field initially takes place. The electromagnetic activation alternating field is received by the antenna 1 of the RFID transponder 16 so that as a result of this, by the microchip 18 of the RFID transponder 16 activation of the reflection properties of the antenna 17 of the RFID transponder 16 is carried out. Before, during and after the start of emission 21 of the electromagnetic activation field, emission 23 of three different electromagnetic alternating fields from the three antenna 14 of the three readers 11, 12, 13 takes place. The different electromagnetic alternating fields which are emitted from the antenna 14 of the readers 11, 12, 13, are each assigned to one reader 11, this means that a first electromagnetic alternating field is emitted by the first reader 11, a second electromagnetic alternating field is emitted by the second reader 12, and a third electromagnetic alternating field is emitted by the third reader 13, in each case from the antenna 14. These three different electromagnetic alternating fields can be differentiated, As of or after the start of activation 22 of the reflection properties of the antenna 17 of the RFID transponder 16, modification 24 of the emitted different electromagnetic alternating fields takes place. The activation 22 of the reflection properties 17 of the RFID transponder 16 is, for example, a result of a request to the RFID transponder 16 to supply data in a wireless or radio-based manner by emitting a corresponding electromagnetic alternating field from the antenna 17 of the RFID transponder 16. The modification 24 is for example carried out as a marking of the three emitted different electromagnetic alternating fields, in that the amplitude of every third, fifth or seventh wave of the electromagnetic alternating field is modified, for example the amplitude of every third, fifth or seventh wave is increased. The emitted different electromagnetic alternating fields are reflected on the antenna 17 of the RFID transponder 16, i.e. reflection 25 of the different modified electromagnetic alternating fields takes place at the antenna 17. After reflection 25, the emitted different modified electromagnetic alternating fields are received back 26 at the antenna 14 of the readers 11, 12, 13. The electromagnetic alternating fields received back at the antenna 14 of the readers 11, 12, 13 can be differentiated by the readers 11, 12, 13 so that recording of the first electromagnetic alternating field which is carried out by the first reader 11 is exclusively carried out on the first reader and in an analogue manner the recording of the second electromagnetic alternating field is exclusively carried out on the second reader 12 and the recording of the third electromagnetic alternating field is exclusively carried out in the third reader 13. In this way, in each case determination 27 of the transit time from the start of emission of the modified electromagnetic alternating field can be carried out by one reader 11, 12, 13 until it is received back at the the corresponding reader 11, 12, 13. As the propagation speed of the electromagnetic alternating field is known, through this a determination 28 of the distances from one reader 11, 12, 13 or antenna 14 of a reader 11, 12, 13 to the RFID transponder 16 can be carried out.

With the central processing unit 20, determination 29 of the position of the RFID transponder 16 relative to the motor vehicle then takes place. If the RFID transponder 16 is located in a spatial area around the motor vehicle with a distance of less than 5 metres, unlocking of the door of the motor vehicle 1 takes place. If the RFID transponder 16 is located within the interior space 8 of the motor vehicle 1, automatic starting or clearance to start the at least one drive motor 5 takes place. In the event of clearance to start operation of an operating element, for example, a button, is also required for starting. The electromagnetic activation field and/or the electromagnetic alternating field can have a differing frequency, for example as long wave in the range between 125 kHz and 825 kHz, as short wave at around 14 MHz or as VHF between 860 MHz and 1000 MHz.

Seen overall, significant advantages are associated with the method according to the present disclosure of determining the position of the RFID transponder 16 and the system 30 according to the present disclosure. By way of the method according to the present disclosure the position of the RFID transponder can be simply and reliably determined. By way of the RFID transponder 16 the position of a motor vehicle 1 can also be determined in parking systems. With the arrangement of an RFID transponder 16 in the motor vehicle 1 the position of the motor vehicle 1 can also be determined, for example in front of associated barriers. The radio-based key with an RFID transponder 16 can be determined in the position relative to the motor vehicle 1 so that in this way unlocking of the door of the motor vehicle 1 and automatic starting of the drive motor 5 can be reliably and automatically carried out as a function of the position of the RFID transponder 16 or radio-based key relative to the motor vehicle 1. Third parties cannot therefore bring about the manipulated unlocking of the door and starting of the drive motor 5 through amplification of the emission output of the reader 11, 12, 13.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of determining the position of an RFID transponder comprising:
    separately emitting at least two electromagnetic alternating fields from at least two antenna to an RFID transponder, wherein the at least two antenna are at a distance from one another so that the two electromagnetic alternating fields are emitted at a distance from one another;
    activating reflection properties of an antenna of the RFID transponder;
    modifying, after activating the reflection properties, the emitted at least two electromagnetic alternating fields;
    reflecting the modified at least two electromagnetic alternating fields to the RFID transponder so that the reflected electromagnetic alternating fields are sent back to the at least two antenna;
    determining at least two transit times of the modified at least two electromagnetic alternating fields from the start of emission of each modified electromagnetic alternating field to receiving back each respective modified electromagnetic alternating field;
    determining at least two distances between the at least two antenna and the RFID transponder; and
    determining the position of the RFID transponder from the at least two distances relative to the at least two antenna.

2. The method according to claim 1, wherein further comprising determining with two antenna the position of the RFID transponder two-dimensionally from the at least two distances relative to the at least two antenna.

3. The method according to claim 2, wherein further comprising determining with three antenna the position of the RFID transponder three-dimensionally from the at least two distances relative to the at least three antenna.

4. The method according to claim 1, wherein the at least two antenna are disposed on a motor vehicle that has a drive motor and comprising: determining whether the RFID transponder is located within an interior space of the motor vehicle; and enabling, only when the RFID transponder is located within an interior space, starting of the drive motor.

5. The method according to claim 1, wherein the emitted at least two electromagnetic alternating fields are reflected on only one identical antenna of the RFID transponder.

6. The method according to claim 1, further comprising emitting an electromagnetic alternating field is emitted from at least one antenna of at least one reader for the activation of the reflection properties of the antenna of the RFID transponder, wherein the reflection properties of the antenna of the RFID transponder are then activated so that at least two electromagnetic alternating fields are reflected on the antenna of the RFID transponder.

7. The method according to claim 1, wherein modifying the emitted at least two electromagnetic alternating fields comprises modifying, by a first change in amplitude, one of the emitted at least two electromagnetic alternating fields and modifying, by a second change in amplitude, another of the emitted at least two electromagnetic alternating fields, wherein the first and second changes in amplitude differ from one another.

8. The method according to claim 7, wherein modifying the emitted at least two electromagnetic alternating fields further comprises modifying the emitted electromagnetic alternating fields in that each $x^{th}$ wave has a different amplitude from the other waves outside the $x^{th}$ wave.

9. The method according to claim 7, wherein the received back modified electromagnetic alternating fields are differentiated by at least one reader from unchanged electromagnetic alternating fields.

10. The method according to claim 1, further comprising cryptographically securing at least one of the emitted electromagnetic alternating fields and the activation alternating fields.

11. The method according to claim 1, further comprising determining the position of several RFID transponders, and differentiating the RFID transponders with a transmitted identification code.

12. The method according to claim 1, further comprising emitting different electromagnetic alternating fields by different antenna of the at least one reader, and determining the transit time of each electromagnetic alternating field from emission to receiving back at an identical antenna of the at least one reader.

13. The method according to claim 12, further comprising differentiating the received back, different electromagnetic alternating fields emitted by the different antenna of the at least one reader by the at least one reader, and recording, in each case one different electromagnetic alternating field, by the reader from which it was emitted.

14. The method according to claim 1, further comprising issuing an authorized command when the RFID transponder is located relative to a motor vehicle on the basis of the determined position of the RFID transponder within an area of a notional plane.

15. A system with a motor vehicle and an RFID transponder comprising:
   a vehicle body defining an internal space for accommodating persons enclosed within the vehicle body;
   at least one drive motor;
   at least two antenna disposed onboard the motor vehicle; and
   wherein the system is configured to:
      separately emit at least two electromagnetic alternating fields from at least two antenna to an RFID transponder, wherein the at least two antenna are at a distance from one another so that the two electromagnetic alternating fields are emitted at a distance from one another;
      activate reflection properties of an antenna of the RFID transponder;
      modify, after activating the reflection properties, the emitted at least two electromagnetic alternating fields;
      reflect the modified at least two electromagnetic alternating fields to the RFID transponder so that the reflected electromagnetic alternating fields are sent back to the at least two antenna;
      determine at least two transit times of the at least two electromagnetic alternating fields from the emission received back at the at least two antenna from the start of emission of each modified electromagnetic alternating field to receiving back each respective modified electromagnetic alternating field;
      determine the at least two distances between the at least two antenna and the RFID transponder; and
      determine the position of the RFID transponder from the at least two distances relative to the at least two antenna.

16. The system according to claim 15, wherein the RFID transponder comprises an RFID transponder for starting the least one drive motor and the at least one drive motor can only be started if the RFID transponder is located relative to the motor vehicle on the basis of the determined position of the RFID transponder within an area of a notional plane.

\* \* \* \* \*